United States Patent
Jung et al.

(10) Patent No.: US 12,322,797 B2
(45) Date of Patent: Jun. 3, 2025

(54) POSITIVE ELECTRODE ACTIVE MATERIAL, AND POSITIVE ELECTRODE AND LITHIUM SECONDARY BATTERY INCLUDING SAME

(71) Applicant: LG Chem, Ltd., Seoul (KR)

(72) Inventors: Won Sig Jung, Daejeon (KR); Kang Hyeon Lee, Daejeon (KR); Tae Young Rhee, Daejeon (KR); Hwan Young Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 591 days.

(21) Appl. No.: 17/768,548

(22) PCT Filed: Oct. 23, 2020

(86) PCT No.: PCT/KR2020/014606
§ 371 (c)(1),
(2) Date: Apr. 13, 2022

(87) PCT Pub. No.: WO2021/080384
PCT Pub. Date: Apr. 29, 2021

(65) Prior Publication Data
US 2023/0142182 A1 May 11, 2023

(30) Foreign Application Priority Data
Oct. 23, 2019 (KR) .................. 10-2019-0132505

(51) Int. Cl.
*H01M 4/485* (2010.01)
*H01M 4/02* (2006.01)
*H01M 4/505* (2010.01)
*H01M 4/525* (2010.01)
*H01M 10/0525* (2010.01)

(52) U.S. Cl.
CPC ........... *H01M 4/485* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 6,265,111 | B1 * | 7/2001 | Bito ...................... | H01M 4/366 429/231.95 |
| 2009/0029253 | A1 | 1/2009 | Itou et al. | |
| 2010/0019194 | A1 * | 1/2010 | Fujiwara ............... | H01M 4/525 252/182.1 |
| 2014/0158932 | A1 | 6/2014 | Sun et al. | |
| 2016/0049647 | A1 | 2/2016 | Park et al. | |
| 2016/0218350 | A1 | 7/2016 | Noh et al. | |
| 2016/0268594 | A1 | 9/2016 | Kim et al. | |
| 2017/0155132 | A1 | 6/2017 | Kong et al. | |
| 2017/0237069 | A1 * | 8/2017 | Takamori ............... | C01G 53/50 429/223 |
| 2017/0358798 | A1 | 12/2017 | Kageura et al. | |
| 2018/0026266 | A1 | 1/2018 | Choi et al. | |
| 2018/0212237 | A1 | 7/2018 | Lee et al. | |
| 2018/0316005 | A1 | 11/2018 | Shin et al. | |
| 2018/0375096 | A1 | 12/2018 | Aoki et al. | |
| 2019/0020020 | A1 * | 1/2019 | Zhou ..................... | H01M 4/525 |
| 2019/0148721 | A1 | 5/2019 | Park et al. | |
| 2019/0372110 | A1 | 12/2019 | Nam et al. | |
| 2020/0266439 | A1 | 8/2020 | Park et al. | |
| 2024/0170658 | A1 * | 5/2024 | Kumagai ............... | C22F 1/04 |

FOREIGN PATENT DOCUMENTS

| | | |
|---|---|---|
| CN | 109817955 A | 5/2019 |
| JP | 2008034369 A | 2/2008 |
| JP | 2011096655 A | 5/2011 |
| JP | 2017536685 A | 12/2017 |
| JP | 2018060759 A | 4/2018 |
| JP | 2018103581 A | 7/2018 |
| KR | 100991650 B1 | 11/2010 |
| KR | 20130138073 A | 12/2013 |
| KR | 20150024371 A | 3/2015 |
| KR | 20160093817 A | 8/2016 |
| KR | 20170103699 A | 9/2017 |
| KR | 20180063862 A | 6/2018 |
| KR | 20180121267 A | 11/2018 |
| KR | 20190026571 A | 3/2019 |
| KR | 20190032119 A | 3/2019 |
| KR | 20190054986 A | 5/2019 |
| KR | 20190069367 A | 6/2019 |
| WO | 2016060105 A1 | 4/2016 |
| WO | 2016104488 A1 | 6/2016 |
| WO | 2017110063 A1 | 6/2017 |

OTHER PUBLICATIONS

International Search Report for PCT Application No. PCT/KR2020/014606 dated Feb. 2, 2021, 2 pgs.
Extended European Search Report including Written Opinion for Application No. 20878538.6 dated Oct. 28, 2022, pp. 1-7.
Han, Y. et al., "Hierarchically assembled LiNi0.8Co0.1Mn0.1O2 secondary particles with high exposure of {010} plane synthesized via co-precipitation method", Electrochimica Acta, Elsevier, Amsterdam, NL, Oct. 17, 2019 (Oct. 17, 2019), pp. 1-11, vol. 329. XP085919365.

(Continued)

*Primary Examiner* — Kevin M Bernatz
(74) *Attorney, Agent, or Firm* — Lerner David LLP

(57) ABSTRACT

A positive electrode active material, a positive electrode including the positive electrode active material, and a lithium secondary battery including the same are disclosed herein. In some embodiments, the positive electrode active material includes a lithium transition metal oxide containing nickel in an amount of 60 mol % or greater based on a total number of moles of transition metals in the lithium transition metal oxide, and in the form of a secondary particle which is an aggregate of primary particles. The positive active material satisfies Equation (1): $-0.021x+4.0 \leq y \leq -0.021x+5.5$, wherein x is a crystal grain size (nm) of the positive electrode active material, and y is a crystal grain aspect ratio of the positive electrode active material.

10 Claims, No Drawings

(56) References Cited

OTHER PUBLICATIONS

Search Report dated Nov. 8, 2023 from the Office Action for Chinese Application No. 202080071963.4 issued Nov. 9, 2023, pp. 1-2.
Wang, D. "Synthesis and Modification of High Voltage Ternary Positive Electrode Material for Lithium Ion Battery" Beijing Metallurgical Industry Press, Mar. 2019, Paragraph 1, pp. 1-3.
Zu, Y. et al., " Introduction to Chemical Process Development " Shaanxi Science and Technology Press, Aug. 1994, pp. 1-8.
Search Report dated Jun. 9, 2023 from the Office Action for Chinese Application No. 202080071963.4 issued Jun. 12, 2023, pp. 1-3. [see pp. 1-2, categorizing the cited references.].

\* cited by examiner

POSITIVE ELECTRODE ACTIVE MATERIAL, AND POSITIVE ELECTRODE AND LITHIUM SECONDARY BATTERY INCLUDING SAME

CROSS-REFERENCE TO RELATED APPLICATIONS

This application is a national phase entry under 35 U.S.C. 371 of International Application No. PCT/KR2020/014606, filed on Oct. 23, 2020, which claims the benefit of Korean Patent Application No. 10-2019-0132505, filed on Oct. 23, 2019, the disclosures of which are incorporated by reference herein.

TECHNICAL FIELD

The present invention relates to a positive electrode active material for a lithium secondary battery, and a positive electrode and a lithium secondary battery including the same, and more specifically, to a positive electrode active material whose crystal grain size and aspect ratio satisfy specific conditions, a positive electrode for a lithium secondary battery including the positive electrode active material, and a lithium secondary battery.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal oxide is used. Among such lithium transition metal oxides, a lithium-cobalt oxide, such as $LiCoO_2$, which has a high functional voltage and excellent capacity properties has been mainly used. However, $LiCoO_2$ has very poor in thermal properties due to the destabilization of a crystal structure according to de-lithium, and is also expensive. Therefore, $LiCoO_2$ has a limitation in being used as a power source in a field such as an electric vehicle or the like in a large amount.

As a material to replace $LiCoO_2$, a lithium manganese composite metal oxide ($LiMnO_2$, $LiMn_2O_4$, and the like), a lithium iron phosphate compound ($LiFePO_4$ and the like), or a lithium nickel composite metal oxide ($LiNiO_2$ and the like) and the like has been developed. Among the above materials, research and development has been actively conducted on a lithium nickel composite metal oxide which has a high reversible capacity of about 200 mAh/g, thereby easily implementing a high capacity battery. However, when compared with $LiCoO_2$, the $LiNiO_2$ has a lower thermal stability, and has a problem in that when external pressure or the like causes an internal short circuit in a charged state, a positive electrode active material itself is decomposed, causing the rupture and ignition of a battery. Accordingly, as a method for improving the thermal stability of $LiNiO_2$, which is low, while maintaining the excellent reversible capacity thereof, $LiNi_{1-\alpha}Co_\alpha O_2$ ($\alpha=0.1\sim0.3$), in which a part of nickel is substituted with cobalt, or a lithium-nickel-cobalt metal oxide, in which a part of nickel is substituted with Mn, Co, or Al, has been developed. In recent years, a lithium composite transition metal oxide including two or more transition metals such as Li $[Ni_aCo_bMn_c]O_2$, Li $[Ni_aCo_bAl_c]O_2$, Li $[Ni_aCO_bMn_cAl_d]O_2$ have been developed and are being widely used.

The lithium composite transition metal oxide including two or more transition metals is typically produced in a spherical secondary particle form in which tens to hundreds of primary particles are aggregated. Depending on the orientation form of a primary particle or the shape (aspect ratio) of a primary particle, physical properties, such as the mobility of lithium ions or electrolyte solution wetting properties, vary. Therefore, there have been studies conducted to analyze the shape (aspect ratio, etc.) or orientation properties of a primary particle of a positive electrode active material through Scanning Electron Microscope (SEM) or Transmission Electron Microscope (TEM) analysis so as to improve the performance of the positive electrode active material thereby.

However, in the case of an TEM analysis, it can only obtain information on some regions of a particle, other than a whole particle, so that there is a problem in that it is difficult for the analysis to represent the properties of the whole positive electrode active material particle. In addition, the physical properties of a positive electrode active material vary not only depending on the shape or orientation properties of a primary particle, but also depending on a crystal grain structure, so that even if primary particles have similar shapes or orientation properties, the physical properties thereof may be different from each other.

Therefore, in order to develop a positive electrode active material having more excellent properties, there is a demand for the development of a positive electrode active material whose crystal grain structure is controlled.

DISCLOSURE OF THE INVENTION

Technical Problem

A first aspect of the present invention provides a positive electrode active material whose crystal grain size and crystal grain aspect ratio satisfy specific conditions, thereby having excellent electrochemical properties.

A second aspect of the present invention provides a positive electrode for a lithium secondary battery including the positive electrode active material, and a lithium secondary battery.

Technical Solution

According to an aspect of the present invention, there is provided a positive electrode active material including a lithium transition metal oxide containing nickel in an amount of 60 mol % or greater based on a total number of moles of transition metals and in the form of a secondary particle in which primary particles are aggregated, wherein the positive electrode active material satisfies the condition of Equation (1) below.

$$-0.021x+4.0 \leq y \leq -0.021x+5.5 \qquad \text{Equation (1)}$$

In Equation (1) above, x is a crystal grain size (unit: nm) of the positive electrode active material, and y is a crystal grain aspect ratio of the positive electrode active material.

Preferably, in Equation (1) above, x may satisfy $100 \leq x \leq 180$ or $120 \leq x \leq 160$, and y may satisfy $1 \leq y \leq 2.5$ or $1.3 \leq y \leq 2.5$.

The lithium transition metal oxide may be represented by Formula 1 below.

$$Li_{1+x}Ni_yCO_zM^1_wM^2_vO_2 \qquad \text{[Formula 1]}$$

In Formula 1 above, $M^1$ is Mn, Al, or a combination thereof, $M^2$ is at least one from the group consisting of B, Al, Zr, Y, Mo, Cr, V, W, Ta, and Nb, and $-0.1 \leq x \leq 0.2$, $0.6 \leq y < 1.0$, $0 < z < 0.4$, $0 < w < 0.4$, and $0 \leq e \leq 0.1$. Preferably, in Formula 1 above, MI is Mn, or a combination of Mn and Al, and $0.85 \leq y < 1.0$, $0 < z < 0.15$, $0 < w < 0.15$, and $0 \leq e \leq 0.05$.

According to another aspect of the present invention, there are provided a positive electrode for a lithium secondary battery including the positive electrode active material, and a lithium secondary battery including the positive electrode.

Advantageous Effects

When a positive electrode active material whose crystal grain size and crystal grain aspect ratio satisfy specific conditions is used as in the present invention, the resistance properties and lifespan properties of a lithium secondary battery may be significantly improved. When the crystal grain size and aspect ratio of the positive electrode active material satisfy conditions of the present invention, there may be effects in that crystal grains are arranged in a direction from the center of a positive electrode active material particle to the surface thereof, so that lithium mobility is increased, lithium travel distance is shortened, so that excellent resistance properties are exhibited, and the shrinkage expansion energy of a particle is dispersed to reduce particle breakage during a charging and discharging process, so that lifespan properties are improved.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present invention, a 'crystal grain' means a single crystal grain unit having a regular atomic arrangement.

The size of the crystal grain is a value measured by analyzing XRD data, which is obtained by performing X-ray diffraction analysis on positive electrode active material powder, by the Rietveld refinement method.

In the present invention, a 'strain' is a value indicating the degree of deformation of a crystal lattice, which may be measured by performing a Rietveld refinement analysis on X-ray diffraction data.

The crystal grain size and strain may be measured using Highscore, an XRD data refinement program of Malvern Co., Ltd., and specifically, may be obtained by fitting full widths at half-maximum (FWHM) of all peaks appearing in XRD data with the Caglioti equation.

In the present invention, the aspect ratio of a crystal grain means a ratio a/c of a long axis length (a) of a crystal grain to a short axis length (c) thereof calculated by applying a full width at half-maximum (FWHM) of each peak appearing in XRD data to a Scherrer equation modified by applying ellipsoid modeling. Specifically, a crystal grain aspect ratio y means a ratio of a long axis length a to a short axis length c obtained through a least square estimation method after applying a full width at half-maximum (FWHM) of each peak appearing in XRD data, obtained by performing X-ray diffraction analysis on a positive electrode active material, to Equation (2) below.

$$d_{(hkl)} = \frac{K\lambda}{2\cos\theta \sqrt{\left\{a\cos\left(\tan^{-1}\left(\frac{a}{c}\tan\left(\frac{\sqrt{l^2}}{\sqrt{h^2+k^2}}\right)\right)\right)\right\}^2 + \left\{c\sin\left(\tan^{-1}\left(\frac{a}{c}\tan\left(\frac{\sqrt{l^2}}{\sqrt{h^2+k^2}}\right)\right)\right)\right\}^2}} \quad \text{Equation (2)}$$

In Equation (2) above, d(hkl) is a full width at half-maximum in a corresponding peak, h, k, and l are the Miller indices in a crystal plane of the corresponding peak, K is a Scherrer constant, θ is a Bragg angle, λ is an X-ray wavelength, a is the length of a long axis of a crystal grain, and c is the length of a short axis of the crystal grain.

In the present invention, a 'primary particle' means the smallest particle unit that is distinguished as being one mass when a cross-section of a positive electrode active material is observed through a scanning electron microscope (SEM), and may be made of a single crystal grain, or a plurality of crystal grains. In the present invention, an average particle diameter of the primary particle may be measured by a method for measuring the size of each particle distinguished in SEM data on the cross-section of a positive electrode active material particle.

In the present invention, a 'secondary particle' means a secondary structural body formed by the aggregation of a plurality of primary particles. An average particle diameter of the secondary particle may be measured using a particle size analyzer, and in the present invention, s3500 of Microtrac Co., Ltd was used as a particle size analyzer.

Hereinafter, the present invention will be described in detail.

The present inventors have conducted studies to develop a positive electrode active material capable of implementing excellent electrochemical properties, and have found that when the crystal grain size and crystal grain aspect ratio of a positive electrode active material satisfy a specific relationship, the capacity properties and lifespan properties of a lithium secondary battery are significantly improved, and completed the present invention.

Positive Electrode Active Material

A positive electrode active material according to the present invention includes a lithium transition metal oxide containing nickel in an amount of 60 mol % or greater based on a total number of moles of transition metals except for lithium and in the form of a secondary particle in which primary particles are aggregated, wherein the positive electrode active material satisfies the condition of Equation (1) below.

$-0.021x+4.0 \leq y \leq -0.021x+5.5$      Equation (1)

In Equation (1) above, x is a crystal grain size (unit: nm) of the positive electrode active material, and y is a crystal grain aspect ratio of the positive electrode active material. Preferably, in Equation (1) above, x may satisfy 100≤x≤180 or 120≤x≤160, and y may satisfy 1≤y≤2.5 or 1.3≤y≤2.5.

When the crystal grain size and crystal grain aspect ratio of a positive electrode active material satisfy the condition of Equation (1) above, there is an excellent effect of improving resistance properties and lifespan properties.

Meanwhile, in the present invention, the crystal grain size x is a value obtained by fitting a full width at half-maximum (FWHM) of each peak appearing in XRD data, obtained by performing X-ray diffraction analysis on the positive electrode active material, with the Caglioti equation, and the crystal grain aspect ratio y is a ratio of a long axis length to a short axis length obtained by performing ellipsoid modeling on the full width at half-maximum (FWHM) of each peak appearing in XRD data obtained by performing X-ray diffraction analysis on the positive electrode active material.

Hereinafter, methods for measuring the crystal grain size x and the crystal grain aspect ratio y will be described in detail.

First, an X-ray diffraction analysis is performed on a positive electrode active material to obtain XRD data. At this time, the X-ray diffraction analysis may be performed under the following conditions using the Empyreon XRD equipment of Malyer panalytical Co., Ltd.

<X-Ray Diffraction Analysis Conditions>

Light source: Cu-target, 45 kV, 40 mA output

Detector: GaliPIX3D

Specimen preparation: About 5 g of a specimen is filled in a holder having a 2 cm diameter and loaded into a rotation stage.

Measurement time: About 30 minutes

Measurement region: 2θ=15° to 85°

Next, the XRD raw data measured under the above conditions are processed using the Highscore program of Malyer panalytical Co., Ltd to obtain the crystal grain size x and a crystal strain. At this time, it is set that the full width at half-maximum is be measured using the Caglioti equation, and a peak profile is measured using the Psedo Voigt function.

Meanwhile, the crystal grain aspect ratio according to the present invention may be measured by obtaining a full width at half-maximum (FWHM) of each peak appearing in the XRD data, applying the full width at half-maximum (FWHM) of each peak to Equation (2) below, which is a Scherrer equation modified by applying ellipsoid modeling, to obtain equations, fitting the obtained equations with least squares estimation, which is a nonlinear equation solution, to obtain a long axis length a and a short axis length c, and then calculating a ratio (a/c) of the long axis length a to the short axis length c.

$$d_{(hkl)} = \frac{K\lambda}{2\cos\theta \sqrt{\left\{a\cos\left(\tan^{-1}\left(\frac{a}{c}\tan\left(\frac{\sqrt{l^2}}{\sqrt{h^2+k^2}}\right)\right)\right)\right\}^2 + \left\{c\sin\left(\tan^{-1}\left(\frac{a}{c}\tan\left(\frac{\sqrt{l^2}}{\sqrt{h^2+k^2}}\right)\right)\right)\right\}^2}}$$

Equation (2)

In Equation (2) above, d(hkl) is a full width at half-maximum in a corresponding peak, h, k, and l are the Miller indices in a crystal plane of the corresponding peak, K is a Scherrer constant, θ is a Bragg angle, λ is an X-ray wavelength, a is the length of a long axis of a crystal grain, and c is the length of a short axis of the crystal grain.

Meanwhile, in the present invention, the crystal grain size x is preferably 100 nm to 180 nm, or 120 nm to 160 nm. In addition, the crystal grain aspect ratio y is preferably 1 to 2.5, or 1.3 to 2.5. When the crystal grain size and the crystal grain aspect ratio both satisfy the above ranges, capacity properties, resistance properties, and lifespan properties are all excellent. When the size of a crystal grain is too small or the aspect ratio thereof is too high, the contact area with an electrolyte solution increases, so that degradation may occur quickly. When the size of a crystal grain is too big, or the aspect ratio thereof is low, a rock salt phase is formed, so that resistance properties and lifespan properties may be lowered. In addition, even when the crystal grain size and the crystal grain aspect ratio satisfy the above ranges, if the condition of Equation (1) is not met, the effect of improving capacity properties, resistance properties, or lifespan properties may be lowered.

Meanwhile, the positive electrode active material according to the present invention includes a lithium transition metal oxide containing nickel in an amount of 60 mol % or greater based on a total number of moles of transition metals except for lithium.

Specifically, the lithium transition metal oxide may be represented by Formula 1 below.

$$Li_{1+x}Ni_yCo_zM^1_wM^2_eO_2$$ [Formula 1]

In Formula 1 above, $M^1$ is Mn, Al, or a combination thereof, and preferably, may be Mn, or a combination of Mn and Al.

$M^2$ may be at least one from the group consisting of B, Al, Zr, Y, Mo, Cr, V, W, Ta, and Nb.

1+x represents a molar ratio of Li based on a total number of moles of transition metals, wherein the x may satisfy −0.1≤x≤0.2, preferably 0≤x≤0.2, more preferably 0≤x≤0.1.

y represents a molar ratio of Ni based on a total number of moles of transition metals, wherein the y may satisfy 0.6≤y<1, preferably 0.8≤y<1, more preferably 0.85≤y<1.

z represents a molar ratio of Co based on a total number of moles of transition metals, wherein the z may satisfy 0<z<0.4, preferably 0<z<0.2, more preferably 0<z<0.15.

w represents a molar ratio of MI based on a total number of moles of transition metals, wherein the w may satisfy 0<w<0.4, preferably 0<w<0.2, more preferably 0<w<0.15.

e represents a molar ratio of the doping element $M^2$ based on a total number of moles of transition metals, wherein the e may satisfy 0≤e≤0.1, preferably 0≤e≤0.05.

When the lithium transition metal oxide according to the present invention includes a lithium transition metal oxide represented by Formula 1 above, high-capacity properties may be exhibited.

According to the present invention, the lithium transition metal oxide has a secondary particle form in which primary particles are aggregated. When the lithium transition metal oxide is formed in the form of a secondary particle in which primary particles are aggregated, the oxide may implement a high roll-pressing density while having a high specific surface area, and thus, when applied, the energy density per volume may be increased.

Meanwhile, the positive electrode active material according to the present invention may further include a coating layer on the surface of the lithium composite transition metal oxide described above. When a coating layer is further included on the surface of a lithium transition metal oxide, the contact between the lithium transition metal oxide and an electrolyte solution is prevented by the coating layer, so that transition metal elution and gas generation caused by a side reaction with the electrolyte solution may be reduced.

The coating layer may include one or more coating elements selected from the group consisting of Li, B, W, Al, Zr, Na, S, P, and Co.

In addition, in the positive electrode active material, the average particle diameter of a primary particle may be 0.05 µm to 4 µm, preferably 0.1 µm to 2 µm. When the average particle diameter of the primary particle is too large, a rock salt phase is formed, so that resistance properties and lifespan properties may be lowered. When the average particle diameter of the primary particle is too small, the contact area with an electrolyte solution increases, so that degradation may occur quickly.

In addition, in the positive electrode active material, the average particle diameter of a secondary particle may be 2 µm to 25 µm, preferably 4 µm to 18 µm. When the average particle diameter of the secondary particle satisfies the above range, positive electrode active material particles may be prevented from being broken during a roll-pressing process, or the processability at the time of preparing a slurry may be prevented from being degraded.

In addition, the positive electrode active material may have a strain of 0.04% to 0.25%, preferably 0.06 to 0.15%. When the strain is too high, lifespan properties is lowered, and when too low, lithium ion mobility is lowered.

The crystal grain size and crystal grain aspect ratio of a positive electrode active material vary depending on the composition of a precursor which is used when producing the positive electrode active material, the crystal grain shape and orientation properties of the precursor, the size of a positive electrode active material particle, firing conditions, and the like. Therefore, the type of a precursor, firing conditions, and the like may be appropriately adjusted to produce a positive electrode active material satisfying Equation (1) of the present invention.

For example, when a molar ratio of lithium (Li/Me ratio) based on a total number of moles of transition metals increases during firing, or the temperature of the firing increases, the size of a crystal grain may increase, and the aspect ratio of the crystal grain may decrease. On the contrary, when a Li/Me ratio decreases, or a firing temperature decreases within the scope of the present invention, the size of a crystal grain decreases, and the aspect ratio thereof increases. Therefore, a Li/Me ratio, a firing temperature, and the like may be appropriately adjusted during firing to adjust the size of a crystal grain and the aspect ratio thereof to an appropriate range.

Although not limited thereto, the positive electrode active material according to the present invention may be produced by mixing a transition metal hydroxide containing nickel in an amount of 60 mol % or greater based on a total number of moles of transition metals with a lithium raw material such that Li/Me is greater than 1 to 1.2 or less, preferably 1.03 to 1.1, more preferably 1.03 to 1.05, followed by firing at 700° C. to 800° C.

In addition, the crystal grain size and aspect ratio of a positive electrode active material are affected by the crystal grain size and aspect ratio of a positive electrode active material precursor, which is a raw material, so that a positive electrode active material precursor having an appropriate crystal grain structure may be chosen and used to produce a positive electrode active material satisfying the crystal grain size and aspect ratio relationship of the present invention. The crystal grain size and aspect ratio of the positive electrode active material precursor may be controlled by adjusting precursor preparation conditions, for example, co-precipitation reaction conditions such as the input amount of a reaction solution, such as the molar ratio of a transition metal solution and an ammonia solution in the reaction solution, or the pH of the reaction solution, temperature, stirring speed, reaction time, and the like.

Positive Electrode

In addition, the present invention provides a positive electrode for a lithium secondary battery, the positive electrode including the above-described positive electrode active material.

Specifically, the positive electrode includes a positive electrode current collector and a positive electrode active material layer formed on at least one surface of the positive electrode current collector and including the above-described positive electrode active material.

The positive electrode current collector is not particularly limited as long as it has conductivity without a in battery. For example, causing a chemical change stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 to 500 µm, and microscopic irregularities may be formed on the surface of the current collector to improve the adhesion of a positive electrode active material. For example, the positive electrode current collector may be used in various forms such as a film, a sheet, a foil, a net, a porous body, a foam, and a non-woven body.

The positive electrode active material layer may include a conductive material and a binder, together with a positive electrode active material.

At this time, the positive electrode active material may be included in an amount of 80 to 99 wt %, more specifically 85 to 98 wt % based on the total weight of the positive electrode active material layer. When included in the above content range, excellent capacity properties may be exhibited.

At this time, the conductive material is used to impart conductivity to an electrode, conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 1 to 30 wt % based on the total weight of the positive electrode active material layer.

The binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 to 30 wt % based on the total weight of the positive electrode active material layer.

The positive electrode may be manufactured according to a typical method for manufacturing a positive electrode except that the positive electrode active material described above is used. Specifically, the positive electrode may be manufactured by applying a composition for forming a positive electrode active material layer, which is prepared by dissolving or dispersing the positive electrode active material described above and selectively, a binder and a conductive material in a solvent, on a positive electrode current collector, followed by drying and roll-pressing. At this time, the type and content of the positive electrode active material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

In addition, in another method, the positive electrode may be manufactured by casting the composition for forming a positive electrode active material layer on a separate support and then laminating a film obtained by being peeled off from the support on a positive electrode current collector.

Lithium Secondary Battery

In addition, the present invention may manufacture an electrochemical device including the positive electrode. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may soft include carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, mesocarbon microbeads, mesophase pitches, and high-temperature sintered carbon such as petroleum or coal tar pitch derived cokes.

The negative electrode active material may be included in an amount of 80 parts by weight to 99 parts by weight based on a total weight of 100 part by weight of a negative electrode active material layer.

The binder is a component for assisting in bonding between a conductive material, an active material, and a current collector, and is typically added in an amount of 0.1 parts by weight to 10 parts by weight based on a total weight of 100 parts by weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 parts by weight or less, specifically 5 parts by weight, based on a total weight of 100 parts by weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

For example, the negative electrode active material layer may be prepared by applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

The negative electrode active material layer may be prepared by, for example, applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R-CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte solution may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LIN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1 to 5 parts by weight based on a total weight of 100 parts by weight of the electrolyte.

The lithium secondary battery including the positive electrode active material according to the present invention as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

Preparation Example Preparation of Positive Electrode Active Material Precursor A $NiSO_4$, $CoSO_4$, and $MnSO_4$ were mixed in distilled water in an amount such that the molar ratio of nickel: cobalt manganese was 88:6:6 to prepare a transition metal aqueous solution having a concentration of 2.4 M.

Thereafter, deionized water was added to a reactor, and then nitrogen gas was purged in the reactor to remove dissolved oxygen in the water and create a non-oxidizing atmosphere inside the reactor. Thereafter, 7.96 M NaOH was added to maintain the pH inside the reactor at 11.9.

Thereafter, the transition metal aqueous solution was added into the reactor at a rate of 850 mL/hr, and a NaOH aqueous solution and a $NH_4OH$ aqueous solution were respectively added at a rate of 510 mL/hr and at a rate of 160 mL/hr thereto to perform a co-precipitation reaction for 40 hours under conditions of a reaction temperature of 50° C., a pH of 11.4, and a stirring speed of 600 rpm, so as to prepare a positive electrode active material precursor A represented by $Ni_{0.88}Co_{0.06}Mn_{0.06}(OH)_2$ having an average particle diameter of 15 μm.

Preparation Example 2: Preparation of Positive Electrode Active Material Precursor B $NiSO_4$, $CoSO_4$, and $MnSO_4$ were mixed in distilled water in an amount such that the molar ratio of nickel: cobalt manganese was 88:6:6 to prepare a transition metal aqueous solution having a concentration of 2.4 M.

Thereafter, deionized water was added to a reactor, and then nitrogen gas was purged in the reactor to remove dissolved oxygen in the water and create a non-oxidizing atmosphere inside the reactor. Thereafter, 7.96 M NaOH was added to maintain the pH inside the reactor at 11.9.

Thereafter, the transition metal aqueous solution was added into the reactor at a rate of 850 mL/hr, and a NaOH aqueous solution and a $NH_4OH$ aqueous solution were respectively added at a rate of 510 mL/hr and at a rate of 540 mL/hr thereto to perform a co-precipitation reaction for 40 hours under conditions of a reaction temperature of 50° C., a pH of 11.4, and a stirring speed of 600 rpm, so as to prepare a positive electrode active material precursor B represented by $Ni_{0.88}Co_{0.06}Mn_{0.06}(OH)_2$ having an average particle diameter of 15 μm.

Preparation Example 3: Preparation of Positive Electrode Active Material Precursor C A positive electrode active material precursor C represented by $Ni_{0.88}Co_{0.06}Mn_{0.06}(OH)_2$ having an average particle diameter of 5 μm was prepared in the same manner as in Preparation Example 2 except that the co-precipitation reaction was performed for 12 hours.

Example 1

The positive electrode active material precursor A prepared in Preparation Example 1 and LiOH were mixed such that the molar ratio of Li/Me was 1.03, and then fired for 10 hours at 760° C. to prepare a lithium transition metal oxide.

Next, the lithium transition metal oxide and water were mixed in a weight ratio of 1:1, and then washed.

After the washing, boric acid was mixed such that B was included in an amount of 500 ppm based on 100 parts by weight of the lithium transition metal oxide, and the mixture was heat treated at 300° C. to produce a positive electrode active material having a B coating layer on the surface of the lithium transition metal oxide.

Example 2

A positive electrode active material was produced in the same manner as in Example 1 except that the molar ratio of Li/Me was 1.05.

Example 3

A positive electrode active material was produced in the same e manner as in Example 1 except that a lithium transition metal oxide was prepared by performing firing for 10 hours at 770° C., and then used.

Example 4

A positive electrode active material was produced in the same manner as in Example 1 except that a lithium transition metal oxide was prepared by performing firing for 10 hours at 780° C., and then used.

Comparative Example 1

The positive electrode active material precursor B prepared in Preparation Example 2 and LiOH were mixed such that the molar ratio of Li/Me was 1.01, and then fired for 15 hours at 750° C. to prepare a lithium transition metal oxide.

Next, the lithium transition metal oxide and water were mixed in a weight ratio of 1:1, and then washed.

After the washing, boric acid was mixed such that B was included in an amount of 500 ppm based on 100 parts by weight of the lithium transition metal oxide, and the mixture was heat treated at 300° C. to produce a positive electrode active material having a B coating layer on the surface of the lithium transition metal oxide.

Comparative Example 2

The positive electrode active material precursor C prepared in Preparation Example 3 and LiOH were mixed such that the molar ratio of Li/Me was 1.09, and then fired for 15 hours at 780° C. to prepare a lithium transition metal oxide.

Next, the lithium transition metal oxide and water were mixed in a weight ratio of 1:1, and then washed.

After the washing, boric acid was mixed such that B was included in an amount of 500 ppm based on 100 parts by weight of the lithium transition metal oxide, and the mixture was heat treated at 300° C. to produce a positive electrode active material having a B coating layer on the surface of the lithium transition metal oxide.

Experimental Example 1: Identification of Properties of Positive Electrode Active Material X-ray diffraction analysis (Empyrean, Malvern panalytical Co., Ltd) was performed on the positive electrode active material powder produced in each of Examples 1 to 4 and Comparative Examples 1 and 2 to measure the crystal grain size, crystal grain aspect ratio, and strain thereof. At this time, X-ray diffraction analysis conditions, and methods for measuring crystal grain size, strain, and crystal grain aspect ratio were the same as described above. The measurement results are shown in Table 1 below.

TABLE 1

|  | Crystal grain size (nm) | Strain (%) | Crystal grain aspect ratio (a/c) |
|---|---|---|---|
| Example 1 | 124.2 | 0.097 | 2.41 |
| Example 2 | 132.2 | 0.095 | 2.13 |
| Example 3 | 137.2 | 0.086 | 1.82 |
| Example 4 | 151.6 | 0.072 | 1.31 |
| Comparative Example 1 | 114 | 0.101 | 1.04 |
| Comparative Example 2 | 148 | 0.102 | 2.75 |

Experimental Example 2

The positive electrode active material produced in each of Examples 1 to 4 and Comparative Examples 1 and 2, a carbon black conductive material in Example a polyvinylidene fluoride binder were mixed at a weight ratio of 97.5:1.0:1.5 in a N-methylpyrrolidone solvent to prepare a positive electrode slurry. The positive electrode slurry was applied on one surface of an aluminum current collector, dried at 130° C., and then roll-pressed to manufacture a positive electrode. Meanwhile, a carbon black negative electrode active material and a polyvinylidene fluoride binder were mixed at a weight ratio of 97.5:2.5, and then added into a N-methylpyrrolidone solvent to prepare a negative electrode active material slurry. The negative electrode active material slurry was applied on a copper foil having a thickness of 16.5 μm, dried, and then roll-pressed to manufacture a negative electrode.

A porous polyethylene separator was interposed between the positive electrode and the negative electrode manufactured above to manufacture an electrode assembly, and the electrode assembly was placed inside a battery case. Thereafter, an electrolyte solution was injected into the inside of the case to manufacture a lithium secondary battery. At this time, as the electrolyte solution, an electrolyte solution prepared by dissolving 1 M of $LiPF_6$ in an organic solvent in which ethylene carbonate (EC), dimethyl carbonate (DMC), ethyl methyl carbonate (EMC) were mixed at a ratio of 3:4:3 was injected to manufacture lithium secondary batteries.

Each of the lithium secondary batteries manufactured as described above was charged to 4.25 V with a constant current of 0.2 C at 25° C. and was discharged to 2.5 V with a constant current of 0.2 C, which was set as one cycle, and then a charge/discharge efficiency and initial resistance properties in one cycle were measured.

Thereafter, each of the lithium secondary batteries was charged to 4.25 V with a constant current of 0.33 C at 45° C., and was discharged to 2.5 V with a constant current of 0.33 C, which was set as 1 cycle, and 30 cycles of charge/discharge were performed. The discharge capacity retention rate (%) after 50 cycles based on a discharge capacity after 1 cycle was evaluated as a 50 cycle lifespan properties. The measurement results are shown in Table 2 below.

TABLE 2

|  | Charge capacity (mAh/g) | Discharge capacity (mAh/g) | Efficiency (%) | Initial resistance (Ω) | 50-Cycle lifespan properties (%) |
|---|---|---|---|---|---|
| Example 1 | 227.6 | 202.8 | 89.1 | 21.1 | 94.2 |
| Example 2 | 228.5 | 203.7 | 89.1 | 20.4 | 95.6 |
| Example 3 | 230.1 | 204.1 | 88.7 | 18.7 | 96.3 |
| Example 4 | 229.3 | 203.1 | 88.5 | 20.6 | 95.1 |
| Comparative Example 1 | 221.5 | 197.4 | 89.1 | 35.2 | 92.5 |
| Comparative Example 2 | 218.0 | 197.2 | 90.5 | 51.1 | 88.4 |

As shown in Table 1 and Table 2 above, the lithium secondary batteries to which the positive electrode active materials of Examples 1 to 4 satisfying Equation (1) of the present invention were applied exhibited an equivalent level of initial capacity properties and had greatly improved resistance properties and lifespan properties compared to the lithium secondary batteries to which the positive electrode active materials of Comparative Examples 1 and 2 not satisfying Equation (1) were applied.

The invention claimed is:

1. A positive electrode active material, comprising:
a lithium transition metal oxide,
wherein the lithium transition metal oxide contains nickel in an amount of 60 mol % or greater based on a total number of moles of transition metals on the lithium transition metal oxide,
wherein the lithium transition metal oxide is in the form of a secondary particle, wherein the secondary particle is an aggregate of primary particles, and
wherein the positive electrode active material satisfies Equation (1) below:

$$-0.021x+4.0 \leq y \leq -0.021x+5.5, \qquad \text{Equation (1)}$$

wherein in Equation (1), x is a crystal grain size (nm) of the positive electrode active material, and y is a crystal grain aspect ratio of the positive electrode active material, wherein x is obtained by fitting a full width at half-maximum (FWHM) of all peaks, obtained by X-ray diffraction (XRD) analysis on the positive electrode active material, with the Caglioti equation, and wherein y is a ratio of a long axis length (a) to a short axis length (c) obtained by a least square estimation method after applying a full width at half-maximum (FWHM) of each peak, obtained by performing X-ray diffraction (XRD) analysis on the positive electrode active material, to Equation (2) below:

$$d_{(hkl)} = \frac{K\lambda}{2\cos\theta \sqrt{\left\{a\cos\left(\tan^{-1}\left(\frac{a}{c}\tan\left(\frac{\sqrt{l^2}}{\sqrt{h^2+k^2}}\right)\right)\right)\right\}^2 + \left\{c\sin\left(\tan^{-1}\left(\frac{a}{c}\tan\left(\frac{\sqrt{l^2}}{\sqrt{h^2+k^2}}\right)\right)\right)\right\}^2}} \qquad \text{Equation (2)}$$

wherein $d_{(hk1)}$ is the full width at half-maximum (FWHM) of a corresponding peak, wherein h, k, and l are the Miller indices in a crystal plane of the corresponding peak, K is a Scherrer constant, θ is a Bragg angle, λ is an X-ray wavelength, a is the length of a long axis of a crystal grain, and c is the length of a short axis of the crystal grain.

2. The positive electrode active material of claim 1, wherein x in Equation (1) is in a range of 100 nm≤x≤180 nm.

3. The positive electrode active material of claim 1, wherein x in Equation (1) is in a range of 120 nm≤x≤160 nm.

4. The positive electrode active material of claim 1, wherein Equation (1) is 1 nm≤y≤2.5.

5. The positive electrode active material of claim 1, wherein Equation (1) is 1.3≤y≤2.5.

6. The positive electrode active material of claim 1, wherein the lithium transition metal oxide is represented by Formula 1 below:

$$Li_{1+x'}Ni_{y'}Co_zM^1_wM^2_eO_2, \quad \text{[Formula 1]}$$

wherein $M^1$ is Mn, Al, or a combination thereof, $M^2$ is at least one from the group consisting of B, Al, Zr, Y, Mo, Cr, V, W, Ta, and Nb, and −0.1≤x'<0.2, 0.6≤y'<1.0, 0<z<0.4, 0<w<0.4, and 0≤e≤0.1.

7. The positive electrode active material of claim 6, wherein $M^1$ is Mn, or a combination of Mn and Al, and 0.85≤y'<1.0, 0<z<0.15, 0<w<0.15, and 0≤e≤0.05.

8. The positive electrode active material of claim 1, further comprising a coating layer on the surface of the lithium transition metal oxide.

9. A positive electrode for a lithium secondary battery comprising the positive electrode active material of claim 1.

10. A lithium secondary battery comprising the positive electrode for a lithium secondary battery of claim 9.

* * * * *